UNITED STATES PATENT OFFICE.

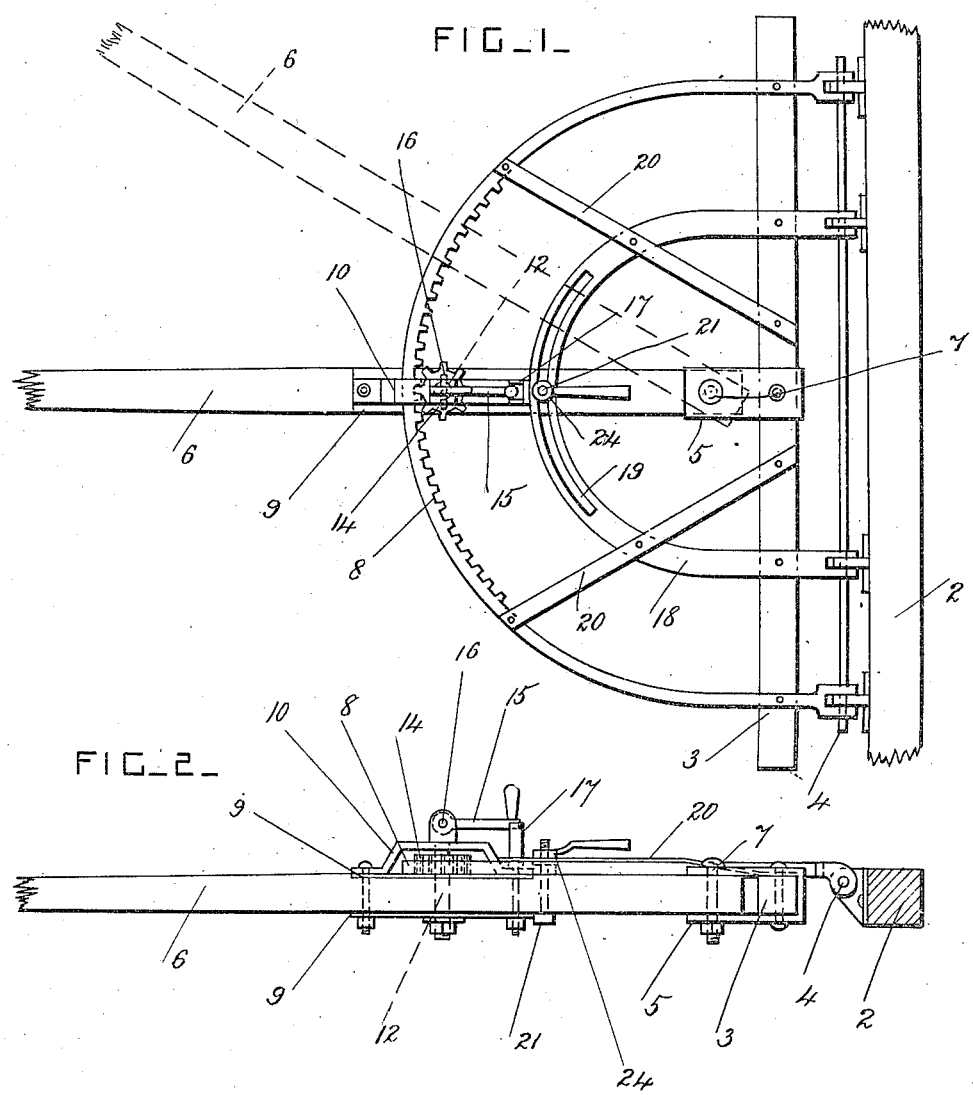

CHARLES J. MAUDLIN, OF SALEM, INDIANA.

DRAFT ATTACHMENT.

1,195,706.  Specification of Letters Patent.  Patented Aug. 22, 1916.

Application filed February 1, 1916. Serial No. 75,499.

*To all whom it may concern:*

Be it known that I, CHARLES J. MAUDLIN, a citizen of the United States, residing at Salem, in the county of Washington and State of Indiana, have invented certain new and useful Improvements in Draft Attachments; and I do hereby declare the following to be a full, clear, and exact description of the invention, such as will enable others skilled in the art to which it appertains to make and use the same.

This invention relates to draft attachments for agricultural implements such as threshing machines; and it consists in the novel construction and combination of the parts hereinafter fully described and claimed, whereby the draft tongue of the machine can be adjusted and secured at any desired angle with the front axle to enable the machine to be shifted about with facility and to make short turns.

In the drawings, Figure 1 is a plan view of a draft attachment constructed according to this invention. Fig. 2 is a side view of the same.

A portion of the front axle 2 of a machine is shown, and this axle and the machine are of any approved construction adapted for traveling on roads. A crosspiece 3 is pivoted in front of and parallel to the axle by pins 4, so that the draft tongue may be moved up and down. A clevis 5 is secured to the middle part of the crosspiece 3, and the rear end portion of the draft tongue 6 is pivoted to the clevis by a vertical pin 7.

A curved toothed rack 8 is provided and is arranged above the draft tongue, concentric with the pivot pin 7, and its ends are secured to the crosspiece 3. Flat bearing plates 9 are secured above and below the draft tongue, and an arch-shaped bearing plate 10 is secured to the upper plate 9. A shaft 12 is journaled in the bearing plates, and a toothed pinion 14 is secured on this shaft and is arranged between the plate 10 and the upper plate 9, and in gear with the curved toothed rack.

A crank handle 15 is pivoted by a pin 16 to the upper end portion of the shaft 12, and a forked catch 17 is secured to the bearing plate 10. The pinion is revolved by the crank handle, which is then dropped into engagement with the forked catch, so that the tongue can be temporarily held from moving.

A curved locking bar 18 is provided, and has a curved slot 19 arranged concentric with the pivot pin 7. The ends of the locking bar are secured to the crosspiece 3, and braces 20 are provided for securing the parts 18 and 8 together and to the crosspiece.

A locking bolt 21 is secured to the draft tongue, and its screwthreaded end projects upwardly through the slot 19 of the locking bar. A locking nut 24 is screwed on the bolt 21 for locking the draft tongue to the locking bar, and this nut has a suitable handle for operating it.

The draft tongue is turned to any desired position, as indicated by the dotted lines in Fig. 1, by means of the crank handle, rack and pinion, and is then secured by the locking bolt. The machine can be then moved in the desired direction with facility. The catch 17 affords a means for temporarily connecting the parts when the angle of the draft tongue with the axle is being adjusted and tried, and before the parts are locked together prior to moving the machine.

What I claim is:

In a draft attachment, a crosspiece adapted to be connected to an axle, a draft tongue pivoted to the crosspiece, a curved toothed rack secured to the crosspiece, a shaft journaled in bearings on the draft tongue, a toothed pinion secured on the said shaft and gearing into the said rack, a crank handle pivoted to the upper end portion of the said shaft, a catch for engaging with the crank handle and temporarily preventing the draft tongue from moving pivotally, a curved locking bar secured to the said crosspiece, and means for clamping the draft tongue to the locking bar.

In testimony whereof I have affixed my signature.

CHARLES J. MAUDLIN.